United States Patent [19]

Ueda et al.

[11] 4,281,342
[45] Jul. 28, 1981

[54] MARK DETECTING SYSTEM USING IMAGE PICKUP DEVICE

[75] Inventors: Hirotada Ueda, San Jose, Calif.; Toshikazu Yasue, Hachioji; Takeshi Uno, Sayama, both of Japan

[73] Assignee: Hitachi, Ltd., Tokyo, Japan

[21] Appl. No.: 24,517

[22] Filed: Mar. 28, 1979

[30] Foreign Application Priority Data

Mar. 29, 1978 [JP] Japan .................................. 53-35493
Apr. 7, 1978 [JP] Japan .................................. 53-40322
Apr. 7, 1978 [JP] Japan .................................. 53-40325

[51] Int. Cl.³ ..................... H04M 7/18; G06F 15/70; G01B 11/14
[52] U.S. Cl. ..................................... 358/93; 358/100; 364/478; 364/559; 356/373; 356/426; 356/399
[58] Field of Search ......................... 358/100, 93, 101; 364/516, 478, 559; 235/435, 454, 455, 465, 469; 340/146.3 K, 146.3 MA, 146.3 AC, 146.3 F, 146.3 Q, 146.3 Z, 146.3 AQ; 356/373, 375, 394, 445, 426, 399

[56] References Cited

U.S. PATENT DOCUMENTS

| 3,922,539 | 11/1975 | Carnes et al. ........................ 364/478 |
| 4,041,286 | 8/1977 | Sanford ................................ 364/559 |
| 4,091,394 | 5/1978 | Kaskioka et al. .............. 340/146.3 Q |
| 4,152,723 | 5/1979 | McMahon et al. ................... 358/106 |

Primary Examiner—Jin F. Ng
Assistant Examiner—Edward L. Coles
Attorney, Agent, or Firm—Craig and Antonelli

[57] ABSTRACT

In a mark detecting system using an image pickup device such as a TV camera in which a mark in the form of a regressive reflector is provided on an object, the field of view of the image pickup device is illuminated with light of a specified wavelength from an illuminating device placed in the vicinity of the image pickup device. The reflected light is introduced on the image pickup device through a filter capable of cutting off light having wavelengths other than the specified wavelength. Since the mark forms a bright pattern on an image produced within the field of view of the image pickup device, the position of the mark can be easily detected by means of a data processor which processes image signals.

35 Claims, 9 Drawing Figures

FIG. 3
| S11 | S12 | S13 | S14 |
| --- | --- | --- | --- |
| S21 | S22 | S23 | S24 |
| S31 | S32 | S33 | S34 |
| S41 | S42 | S43 | S44 |
FIG. 4
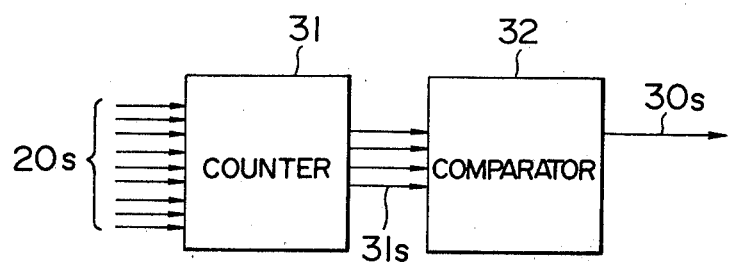
FIG. 5
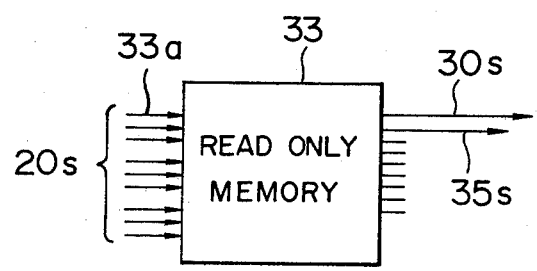

MARK DETECTING SYSTEM USING IMAGE PICKUP DEVICE

The present invention relates to a mark detecting system using an image pickup device, and more particularly to such a system suitable for use in an outdoor automatic positioning system such as a crane in which the image pickup device is used under unstable imaging environments.

In various industrial fields, there have been widely utilized visual information processing apparatuses which employ an image pickup device as input means for information in order to attain high speed processing and reduction of labor. Recently, automation employing a visual information processing apparatus of this type has been required in the field of cargo work in which goods are loaded onto and unloaded from a wagon, a truck or a ship. The automation of cargo work is to effect such a positional control that a clamp or gantry for carrying goods (hereinafter referred to as a spreader) is automatically aligned with a position at which the goods are loaded and unloaded. In other words, a mark provided on a target position is pursued by an image pickup device which is movable along a rail for supporting the spreader and detects the position of the mark appearing on a produced image so that the movement of the spreader is controlled on the basis of the position information thus obtained.

However, unlike another industrial fields such as manufacturing or handling usual industrial products, the field of cargo work has special problems that an object to be imaged is easily soiled and that the image produced by the image pickup device is affected to a large extent by the weather or the background. Therefore, it is difficult to correctly detect the mark from the image information which is obtained by merely producing an image of a scene containing the object. Furthermore, in a cargo handling machine having a spreader of a long rising and falling range, for example, in a roped crane hanging goods to a ship and discharging goods therefrom, the bending of the crane by the weight of the goods and the swing of the spreader by the wind would occur. These make it impossible to keep a constant positional relation between the image pickup device and the spreader. Thus, there is a fear that the discharged goods reach the ground at positions other than a target position even if a target mark on an image produced by the image pickup device is located at a predetermined position. Such erroneous positioning may also arise in an industrial robot having a working arm or the like.

An object of the present invention is to provide a mark detecting system using an image pickup device which can correctly detect a mark provided on an object even under unstable imaging environments.

Another object of the present invention is to provide a mark detecting system using an image pickup device which can detect a mark on an object especially in the sunlight.

A further object of the present invention is to provide an automatic positioning system which uses an image pickup device to detect a mark and which can place an object in a position of a target mark with high accuracy even under unstable imaging environments.

According to one aspect of the present invention, there is provided a mark detecting system for detecting a light reflective mark provided on an object, comprising: image pickup means for producing an image of said object on its imaging plane and for scanning said imaging plane to deliver an image signal; illuminating means for illuminating the field of view of said image pickup means with light of a specified wavelength; filter means for preventing light of wavelengths other than said specified wavelength from impinging upon said image pickup means; and a data processing section for processing said image signal to detect a pattern corresponding to said mark.

According to another aspect of the present invention, there is provided an automatic position control system for locating a movable body provided with a first light reflective mark, at a target position provided with a second light reflective mark, comprising: image pickup means for producing on its imaging plane an image of its field of view containing therein said marks and for scanning said imaging plane to deliver an image signal; illuminating means for illuminating said field of view of said image pickup means with light of a specified wavelength; filter means for preventing light of wavelengths other than said specified wavelength from impinging upon said image pickup means; and a data processing section for processing said image signal to detect patterns corresponding to said first and second marks and to deliver a movable body control signal in accordance with a positional relation between said patterns.

The foregoing and other objects, features and advantages of the present invention will be apparent from the following more particular description of preferred embodiments of the invention, as illustrated in the accompanying drawings, in which:

FIG. 3 is a matrix for explaining a two-dimensional partial area in the characteristic pattern extracting circuit shown in FIG. 2;

FIGS. 4 and 5 are block diagrams for showing different examples of the pattern reducing circuit shown in FIG. 2;

Figure 1:
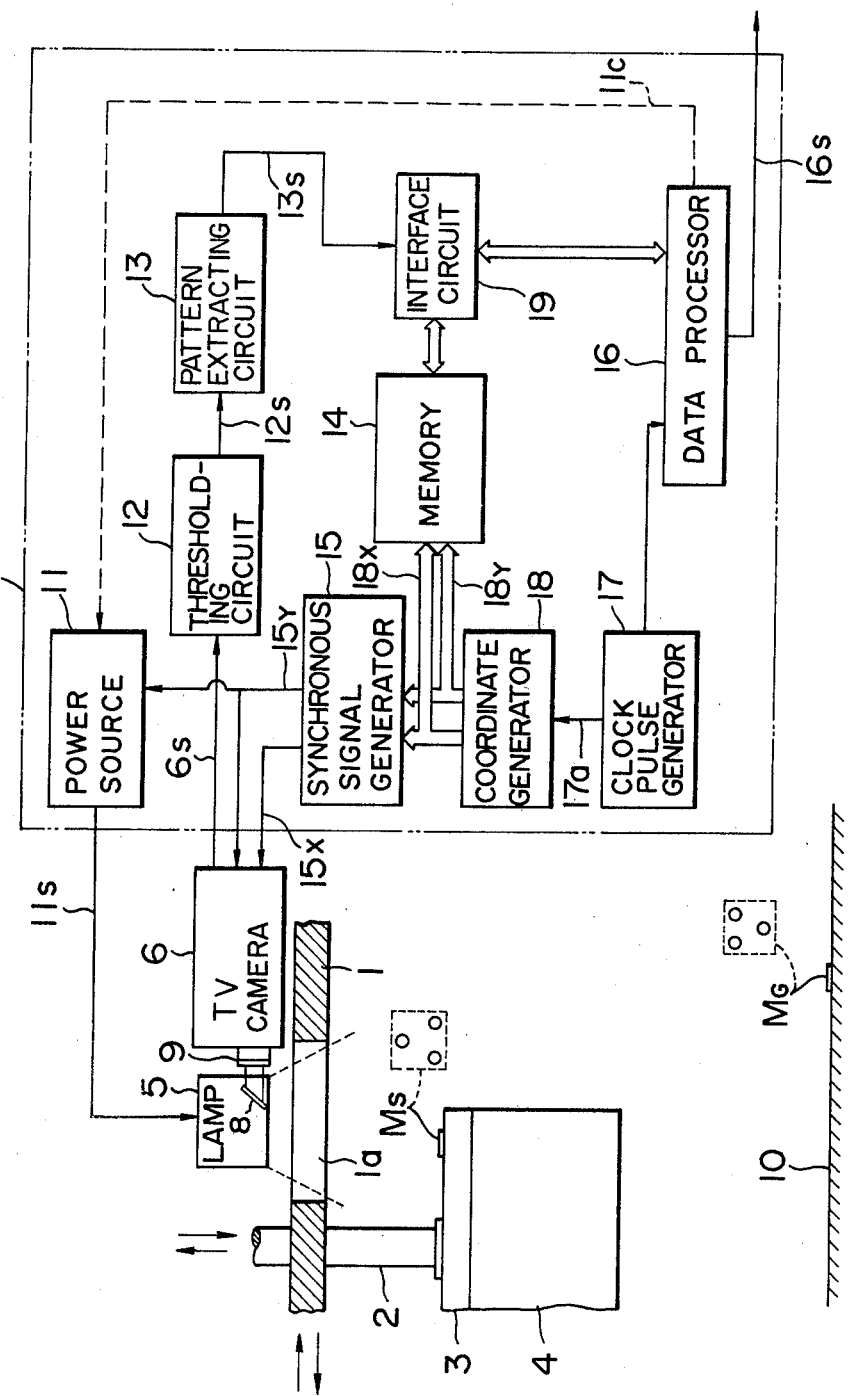
FIG. 1 is a schematic view showing the main part of a cargo-handling machine to which a mark detecting system according to an embodiment of the present invention is applied.

FIG. 1 is a general view for showing an automatic cargo-handling machine employing a mark detecting system according to an embodiment of the present invention. Referring to FIG. 1, reference numeral 1 indicates a trolley provided on a container crane which is movable horizontally (sideways). The trolley 1 is provided with a vertically (up and down) movable beam or rope 2 and with a spreader 3 located at the lower end of the beam for holding container 4. On the trolley 1 is mounted a position control system including an illuminating device 5, a TV camera 6 exemplified as an image pickup device, and a control section 7 which processes image or video data processing by the TV camera 6 and delivers a position control signal on the basis of the results of the processing. The position control system is movable together with the spreader 3. The illuminating device 5 illuminates a cargo loading and unloading surface 10 through an aperature 1a formed in the trolley 1. The TV camera 6 produces an image of the surface 10 which is illuminated through the aperture 1a by the illuminating device 5. The TV camera, as shown in FIG. 1, is horizontally positioned so that the reflected light from the area 10 impinges on the TV camera through a mirror 8 and a filter 9 which is permeable to a specified wavelength component of light. A mark $M_S$ provided on the upper surface of the spreader 3 always lies within the field of view of the TV camera 6. On the other hand, a positioning mark $M_G$ provided on the cargo loading and unloading surface 10 may come into the field of view of the TV camera with the movement of the trolley 1.

The control section 7 includes a power source circuit 11 for turning the illuminating device 5 on, a thresholding circuit 12 for converting an image or video signal 6s from the TV camera 6 into a binary signal 12s to quantize the image information on the TV camera 6 for every picture element, a circuit or converter 13 for processing the binary signal 12s to extract characteristic patterns on the image, a memory 14 for storing coordinate data of the characteristic patterns, a synchronous signal generator 15 for supplying horizontal and vertical synchronizing signals 15X and 15Y to the TV camera 6, and a data processor 16 such as a microcomputer for processing the data stored in the memory 14 to detect the position of the mark $M_S$ or $M_G$ and for controlling the sequence of the control system to deliver a cargo-work control signal 16s. The control signal 16s is applied to a trolley driving motor circuit (not shown) to control the travel of the trolley 1. The control section 7 further includes a clock pulse generator 17, a counter circuit or coordinate generator 18 responsive to a clock pulse 17a for delivering address data 18X and 18Y respectively indicative of X- and Y-coordinates of a scanning point on the image produced by the TV camera 6, and an interface circuit 19 for accessing the memory 14.

In the illustrated embodiment, the characteristic pattern extracting circuit 13 has the function of extracting characteristic patterns similar to the marks $M_S$ and $M_G$ from the image produced by the TV camera 6, and the address data 18X and 18Y indicative of the above-described X- and Y-coordinates are stored in the memory 14 in response to an output signal 13s from the characteristic pattern extracting circuit 13. In this embodiment, each of the marks $M_S$ and $M_G$, as shown in squares depicted by broken lines in FIG. 1, includes the combination of three circles placed at the respective apexes of a triangle and the triangle of mark $M_S$ is opposite in orientation to that of mark $M_G$. Thus, the characteristic pattern extracting circuit 13 extracts characteristic patterns corresponding to these circles, and the X- and Y-coordinates of the center of each circle are stored in the memory 14. The data processor 16 reads the coordinate data from the memory 14. If the read coordinate data includes three coordinate points having the same positional relation as the apexes of the predetermined triangle of the mark $M_S$ or $M_G$, the data processor 16 identifies the read coordinate data as the mark $M_S$ or $M_G$. In the processor 16, the positional relation between the two marks $M_S$ and $M_G$ is determined on the basis of the X- and Y-coordinates of the center of each triangle. Further, the data processor 16 performs a sequential control function of delivering the control signal 16s to a trolley driving means (not shown) to provide a preset positional relation between the two marks, and stopping the movement of the trolley 1 upon attainment of the preset positional relation to lower the spreader 3.

The marks $M_S$ and $M_G$ each being a target for position detection are illuminated with light of a specified wavelength emitted from the illuminating device 5 and the reflected light impinges on the TV camera 6 through the filter 9. Accordingly, it is not required to employ as the position detecting mark a conventional mark clearly recognizable by human eyes in all weather. A preferable mark is one that reflects in the direction of the TV camera the light emitted from the illuminating device and does not reflect in the direction of the TV camera the light incident on the mark in the directions other than the direction of the illuminating device. As the material for such a mark there may be used a regressive reflector such as a CAT'S EYE lens, a reflector available under the trade name of SCOTCHLITE, or a reflector having a corner cube. Each of these reflectors has a reflection factor much higher than paints (for example, a reflection factor one thousand times as high as that of a white paint mark). Therefore, if the illuminance by the illuminating device 5 used in the present invention is higher than one thousandth of that by the sunlight, the reflected light from a mark surrounded by a white background has an intensity higher than the reflected sunlight from the white background, and thus the mark can be distinguished from the background by appropriately selecting the threshold value used in the thresholding circuit 12 which processes the image signal from the TV camera 6.

When a sodium vapor lamp capable of emitting a line spectrum having a wavelength of 589 m$\mu$ is used as the illuminating device 5 and a filter having a center wavelength of 589 m$\mu$ and a half-width of 2 m$\mu$ is used as the optical filter 9, the quantity of light transmitted through the optical filter is 60% for the light from the lamp and is 1.7% for sunlight. Therefore, the image of a mark produced by the light from the lamp is 35 times as high in brilliance as an image of other bodies produced by the sunlight so that only the image of the mark pattern can be substantially displayed.

A light emitting element such as a light emitting diode which is turned on and off by a R.F. receiver, may be used as the positioning mark $M_G$ in place of the aforementioned reflector. In this case, a R.F. transmitter for controlling the on-off operation of the light emitting element may be employed in place of the illuminating device 5 and the power source circuit 11.

The image data processing scheme intended in the control section 7 is not limited to the above-described type in which the coordinate data of characteristic patterns extracted from an image produced by the TV camera are compared with each other. Well-known conventional schemes employing different collating forms may be used. However, when various kinds of noise patterns in the background are taken into consideration, the image data processing scheme of the above-described type in which only characteristic patterns corresponding to the mark are extracted and the position of the mark is detected on the basis of the coordinate of the center of each characteristic pattern, has advantages that pattern collation is easy, that the memory capacity required is small and that the processing speed is fast.

Figure 2:
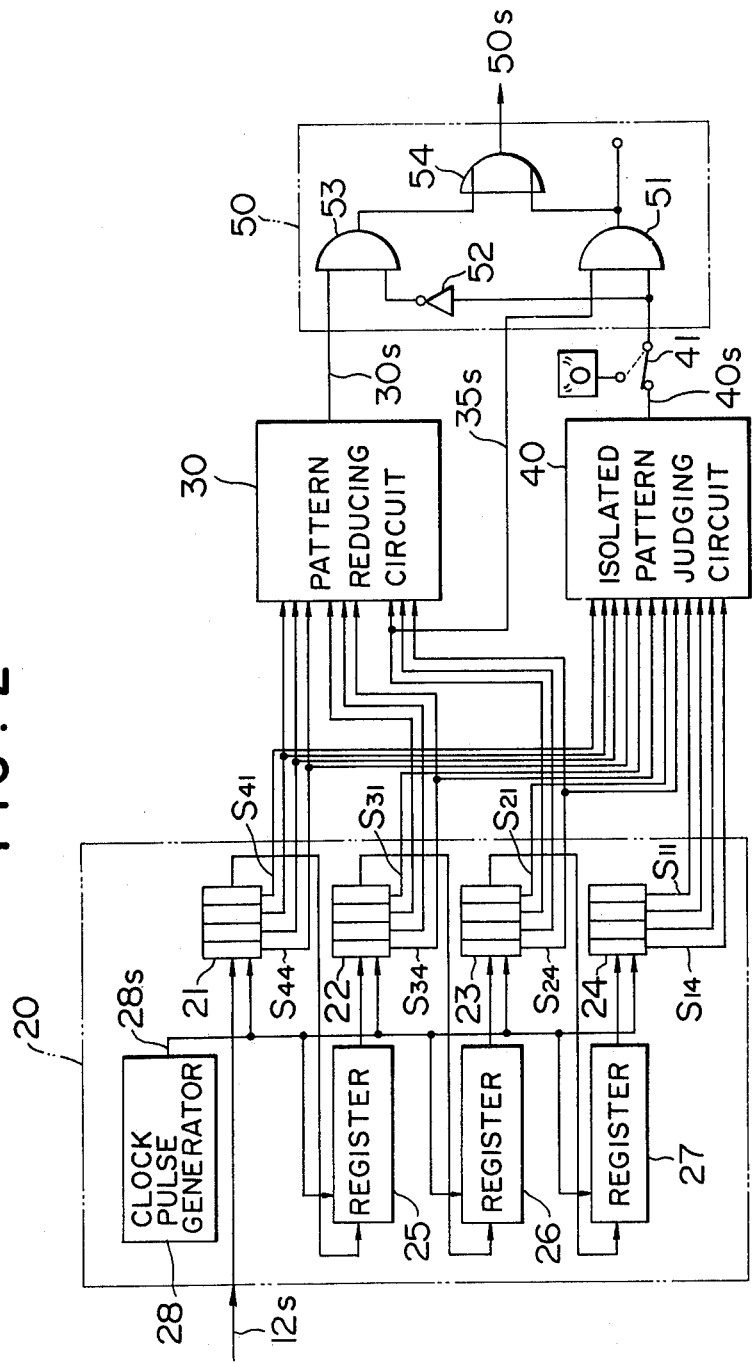
FIG. 2 is a block diagram showing an example of a characteristic pattern extracting circuit suitable for use in the present invention.

Now, an example of the characteristic pattern extracting circuit 13 suitable for use in the aforementioned data processing will be explained referring to FIG. 2. The circuit arrangement shown in FIG. 2 is a pattern information converting circuit arrangement which includes a circuit 20 for successively receiving the binary signal 12s from the thresholding circuit 12 indicative of the information of respective picture elements and for arranging the picture element information in a two-dimensional array to cut out a two-dimensional partial area from the image, a pattern reducing circuit 30, an isolated pattern judging circuit 40, and a picture element information selecting circuit 50. Thus, the circuit arrangement shown in FIG. 2 selectively performs the compression of a pattern included in the two-dimensional partial area and the extraction of the central picture element in an isolated pattern.

As the two-dimensional partial area cutting-out circuit 20 there can be in principle employed a circuit which is disclosed in Japanese Patent Publication No. 12492/76. The circuit 20 includes shift registers 21 to 24 for delivering in parallel the information of picture elements included in the two-dimensional partial area, shift registers 25 to 27 for temporarily storing the information of picture elements on X-scanning lines, and a clock pulse generator 28 for applying a clock or shift pulse 28s to each of the shift registers. The shift pulse 28s from the clock pulse generator 28 may be replaced by the clock pulse 17a from the clock pulse generator 17 shown in FIG. 1.

The shift registers are connected in cascade. The binary signal 12s applied to the shift register 21 from the thresholding circuit 12 is successively shifted to shift registers 25, 22, 26, 23, 27, and 24 in the described manner in response to the shift pulse signal 28s. Now assume that the scanning on the imaging plane of the TV camera is conducted in the horizontal direction with the upper left corner of the imaging plane taken as a starting point and the scanning point reaches the fourth picture element on the fourth scanning line counted from the top or first scanning line. Then, the information of each picture element on the first scanning line is stored, in the order of scanning, in a range from the right end of a couple of shift registers 24 and 27 to the left end thereof. Similarly, the picture element information on the second scanning line and the picture element information on the third scanning line are stored in a couple of shift registers 23 and 26 and in a couple of shift registers 22 and 25 respectively. The information of four successive picture elements inclusive of the first picture element on the fourth scanning line is stored in the shift register 21 in the scanned order from the right end thereof to the left end thereof. Thus, the shift registers 21 to 24 each having four bits cover a partial area located at the upper left corner of the imaging plane and including 4×4 picture elements, as shown in FIG. 3. When the scanning point is further advanced by one picture element, the shift registers 21 to 24 cover the information picture elements on a partial area which is shifted in the X-direction by one picture element.

In this embodiment, the pattern reducing circuit 30 receives signals relating to nine picture elements $S_{22}$ to $S_{24}$, $S_{32}$ to $S_{34}$ and $S_{42}$ to $S_{44}$ included in the partial area shown in FIG. 3 to deliver a picture element signal 30s converted in accordance with the states of these nine picture elements. For example, as shown in FIG. 4, the pattern reducing circuit 30 includes a counter 31 for receiving picture element signals 20s from the partial area cutting-out circuit 20 to count the number of picture elements in the state of "1" and to deliver a result 31s of the count in a four-bit binary code, and a comparator 32 for comparing the result 31s of the count with a predetermined value N to deliver a signal of "1" or "0" in accordance with whether the result 31s of the count is equal to or greater than the value N or not. Alternatively, the pattern reducing circuit 30 may be a memory 33 such as a read-only memory (ROM) which has previously stored predetermined data in correspondence with memory addresses. In this case, the combination of respective states of the binary signals 20s applied to nine address lines 33a can specify $2^9$ memory addresses. If the data "1" has been previously stored at a memory address specified by a binary digit in which the number of bits in the state of "1" is equal to or greater than the predetermined value N, a binary signal 30s in the level of "1" will be provided from the memory 33 when the number of picture elements in the state of "1" is equal to or greater than the predetermined value N.

The predetermined value N determines the degree of reduction in size of pattern. If the relation of N=S/2 (S: the area of the partial area as a region to be judged) is established, a pattern is somewhat shifted only in position. That is, a pattern reconstructed by the output signal 30s is approximately equal to that reconstructed by the input signal 31s. However, if the relation of N=S/2+ΔS is employed, the output signal 30s of "0" is delivered at a time when the center of the judged region is placed at the contour portion of an object pattern, and the output signal 30s of "1" is delivered only when the center lies inside the object pattern. Therefore, a pattern reconstructed by the output signal 30s has such a form that the counter portion of the original pattern is removed by a size approximately proportional to ΔS. In the aforementioned embodiment, since the area S of the judged region is defined by nine picture elements, the predetermined value N satisfying the relation of N=S/2+ΔS is any one of 5 to 8.

The isolated pattern judging circuit 40 shown in FIG. 2 may be a circuit (for example, NOR circuit) which receives signals corresponding to picture elements existing on the contour portion of the partial area (namely, picture elements corresponding to $S_{11}$ to $S_{14}$, $S_{21}$, $S_{24}$, $S_{31}$, $S_{34}$ and $S_{41}$ to $S_{44}$ in FIG. 3) and delivers a signal 40s of "1" when the information signals of these picture elements are all in the state of "0". The output signal 40s in the state of "1" is delivered when pattern does not exist in the partial area, or when an isolated pattern exists in a region consisting of picture elements $S_{22}$, $S_{23}$, $S_{32}$ and $S_{33}$.

The picture element information selecting circuit 50 shown in FIG. 2 includes a gate 51 enabled when the output signal 40s from the isolated pattern judging circuit 40 is in the state of "1", a gate 53 enabled in response to the output signal 40s through an inverter circuit 52 when the output signal 40s is in the state of "0", and an OR gate connected with output terminals of the gates 51 and 52. The selecting circuit 50 performs a function of selecting, in accordance with the state of the signal 40s, either one of a signal 35s applied to the gate 51 and the output signal 30s applied to the gate 53 from the pattern reducing circuit 30. The signal 35s corresponds to a representative picture element $S_{22}$ which is placed at the central portion of the partial area. The selecting circuit 50 delivers the selected signal as an output signal to the next circuit stage.

A change-over switch 41 is provided at the output side of the judging circuit 40. When the switch 41 is connected to the potential level of "0", the signal 30s from the pattern reducing circuit 30 may be sent to the next circuit stage irrespective of the result of judgement in the isolated pattern judging circuit 40.

The characteristic pattern extracting circuit 13 shown in FIG. 1 is constructed by cascade-connected plural stages of a converting circuit arrangement as shown in FIG. 2. For the first stage is employed the pattern information converting circuit of FIG. 2 from which the function of the isolated pattern judging circuit 40 is omitted by connecting the switch 41 at the potential level of "0". The first stage erases all isolated patterns in which the number of picture elements in the state of "1" is equal to or less than 5. For each of the second, third and fourth stages is employed the pattern information converting circuit of FIG. 2 in which the switch 41 is connected with the output terminal of the judging circuit 40. In these stages, even when a pattern is reduced to an isolated pattern containing four or less picture elements, the representative picture element $S_{22}$ is maintained by the function of the judging circuit 40, that is, an isolated pattern formed by a single picture element is never erased. For the last stage is employed the circuit of FIG. 2 which consists of the partial area cutting-out circuit 20 and the isolated pattern judging circuit 40 for selecting an isolated pattern. The output of the last stage is taken out of the gate 51. The last stage erases any pattern other than an isolated pattern containing four or less picture elements and delivers a binary signal $13s$ (FIG. 1) indicating that only one picture element representative of the isolated pattern is left.

Figure 6:
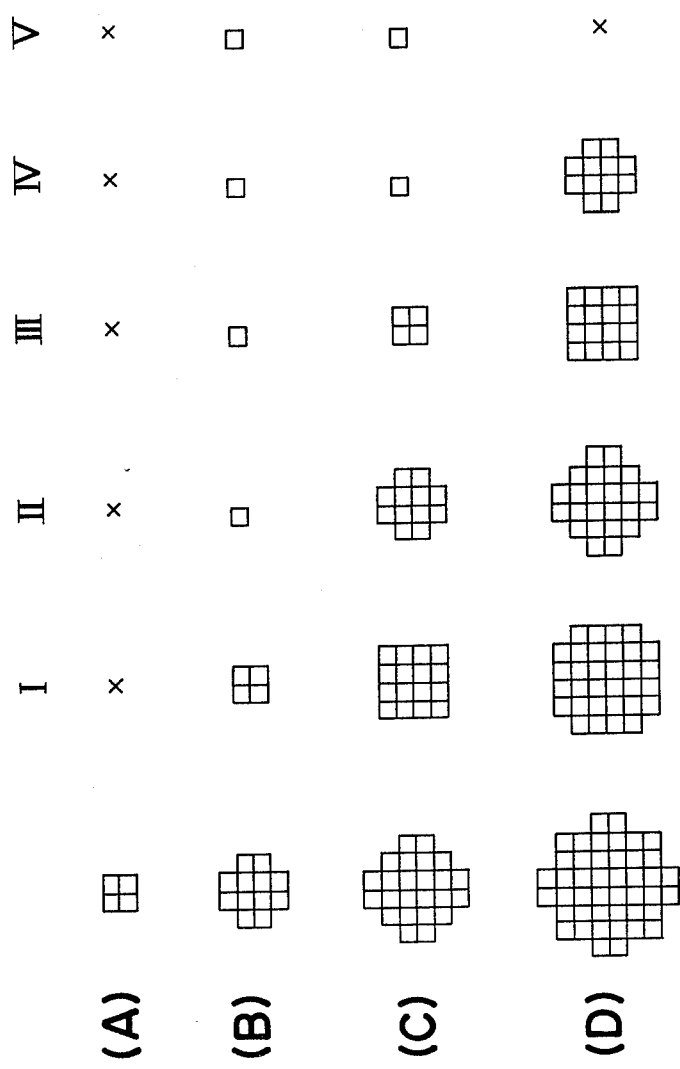
FIG. 6 shows successive steps of a picture element information conversion process in the characteristic pattern extracting circuit shown in FIG. 2.

FIG. 6 shows successive steps of pattern conversion process in the characteristic pattern extracting circuit constructed as described above. Referring to FIG. 6, A, B, C and D indicate patterns of different sizes which may be contained in an image produced by the TV camera. The change of each pattern is shown in steps I, II, III, IV and V corresponding to the aforementioned first, second, third, fourth and last stages. As can be seen from FIG. 6, the pattern A in which the number of picture elements is less than the predetermined value, vanishes in the step I. The patterns B anc C which are reduced to the size of a single picture element in the course of pattern reduction, are not erased but are issued out in the form of a representative picture element by the function of the isolated pattern judging circuit. The large pattern D which cannot be regarded as an isolated pattern even in the step IV, is erased in the step V and does not appear on the output signal.

Thus, in the aforementioned characteristic pattern extracting circuit, an isolated pattern having a size smaller than the predetermined size is first erased from an image produced by the TV camera 6. Then, each of the remaining patterns is compressed toward the center thereof and is converged into a single picture element placed at the center of the pattern. The large pattern which has not been converged into its center picture element, is erased in the last stage. Accordingly, only the isolated patterns having the predetermined size are represented by their center picture elements, and the presence of such a center picture element is indicated by the output signal $13s$ of the characteristic pattern extracting circuit. When the signal $13s$ is in the level of "1", the coordinate data delivered from the coordinate generator 18 is stored into the memory 14 to be processed in the data processor 16.

In the case where the aforementioned image data processing method is employed, there is a possibility that the memory may store coordinate data of a noise pattern which is formed by strong light reflected from, for example, a puddle or a piece of bright paper existing in the field of view of the TV camera and has the same shape as the characteristic pattern making up the target mark $M_G$ or $M_S$. Such a noise pattern has a danger that it may be combined with the characteristic pattern of the mark $M_G$ or $M_S$ so as to make a false target mark. In order to effectively discriminate the false target mark from the real or correct target mark, the power source circuit 11 of FIG. 1 may be constructed with a structure which is controlled by an on-off control signal $11c$ from the data processor 16, thereby turning on and off the illumination given to the field of view of the TV camera by the illuminating device 5. The position of the real target mark can be detected by collating the coordinate data stored in the memory 14 when the illumination is turned on and the coordinate data stored in the memory when the illumination is turned off.

Figure 7:
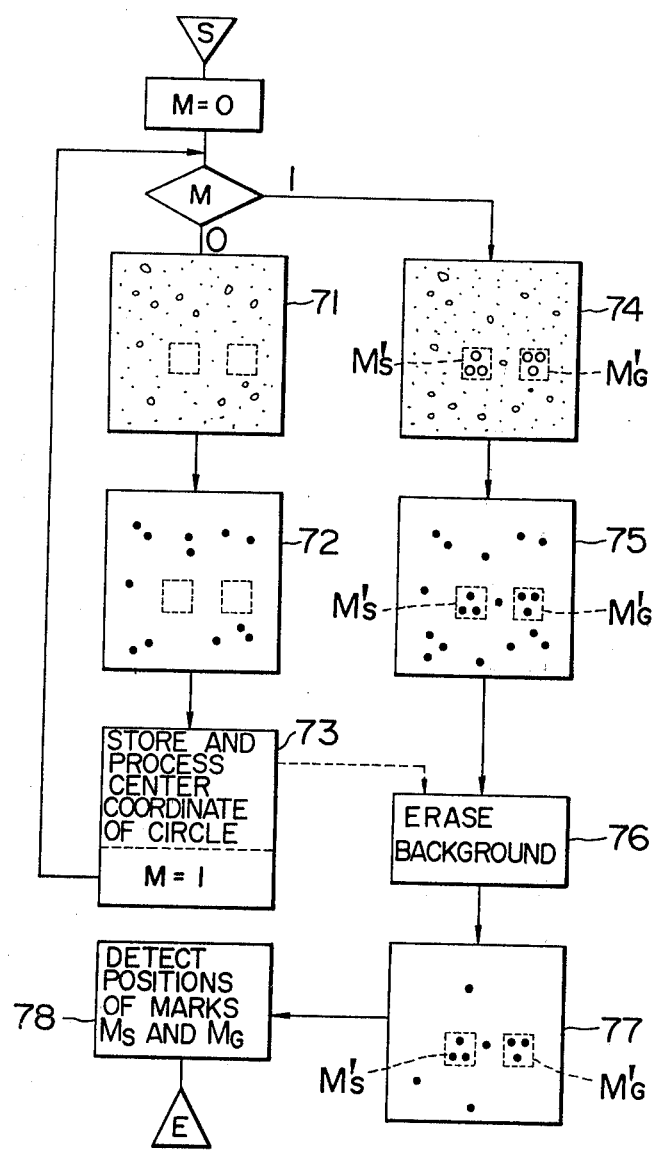
FIG. 7 is a flow chart for showing an example of the image data processing flow.

FIG. 7 shows the concept of the flow of the just-described data processing. Referring to FIG. 7, reference character M corresponds to the turn-off of the illumination, and the relation $M=0$ indicates that the illumination is in the turn-off state. A block 71 shows an image which is produced when the illumination is turned off. This image is processed in the characteristic pattern extracting circuit 13 to extract only predetermined characteristic patterns. A block 72 shows a distribution of characteristic points (indicated by black circles) after the extraction of the characteristic patterns. In a block 73, the coordinate data of the center of each black circle are stored in the memory 14 and the data processor 16 writes the coordinate data in its internal storage and makes the value of M equal to 1 in order to turn the illumination on.

When the illumination is turned on, there appears on a produced image a characteristic pattern $M'_S$ corresponding to the mark $M_S$, as shown in a block 74. If the trolley is placed in the vicinity of a target position, the image also includes a characteristic pattern $M'_G$ corresponding to the mark $M_G$ provided on the target position at which cargoes are unloaded. A block 75 shows a distribution of characteristic points extracted from the image shown in the block 74. The data processor 16 reads the coordinate data of the center of each characteristic point out of the memory 14 and collates the read coordinate data with the coordinate data of the characteristic points shown in the block 72 which have been stored in the internal storage of the data processor. As the result of the collation, noise patterns in the background are erased to obtain the coordinate data of characteristic patterns which do not coincide with the characteristics patterns in the block 72 (see block 76). A block 77 shows a distribution of characteristic points after the collating process has been performed. The data processor 16 extracts the coordinates of characteristic patterns of the marks $M_S$ and $M_G$ on the basis of the positional relation between the remaining characteristic points and calculates the center of each triangle to determine the coordinate of the center of each mark (block 78).

It can be understood from the above that the appearance and disappearance of the marks on the image in response to the on-off control signal $11c$ from the data processor enables the elimination of noise components contained in the background by collating an image pattern at the illumination-on condition with an image pattern at the illumination-off condition. Thus, the number of coordinate data to be processed for the extraction of marks $M_S$ and $M_G$ is reduced, thereby greatly facilitating the processing in the data processor 16.

In the flow chart shown in FIG. 7, it should be noted that it is possible to obtain data at the illumination-on condition in the blocks 71 to 73 while obtaining data at the illumination-on condition in the blocks 74 and 75. In such a case, the elimination of background noise pattern can be made in parallel with the processing of the image signal by successively erasing, from the memory, coordinate data which coincide with coordinates obtained when the illumination is turned off.

The data processor 16 identifies the marks $M_S$ and $M_G$ on the basis of the positional relation between characteristic patterns extracted from the image data, calculates the coordinate of the center of three coordinates making up each mark, namely, the coordinate of the center of the associated triangle, and delivers the control signal 16s for moving the trolley in such a manner that a predetermined positional relation (for example, the coincidence) is obtained between the center coordinates of two marks $M_S$ and $M_G$. In the case where separate characteristic pattern extracting circuits are employed for the marks $M_S$ and $M_G$ respectively, one of the marks $M_S$ and $M_G$ may have any shape independently of the other.

Figure 8:
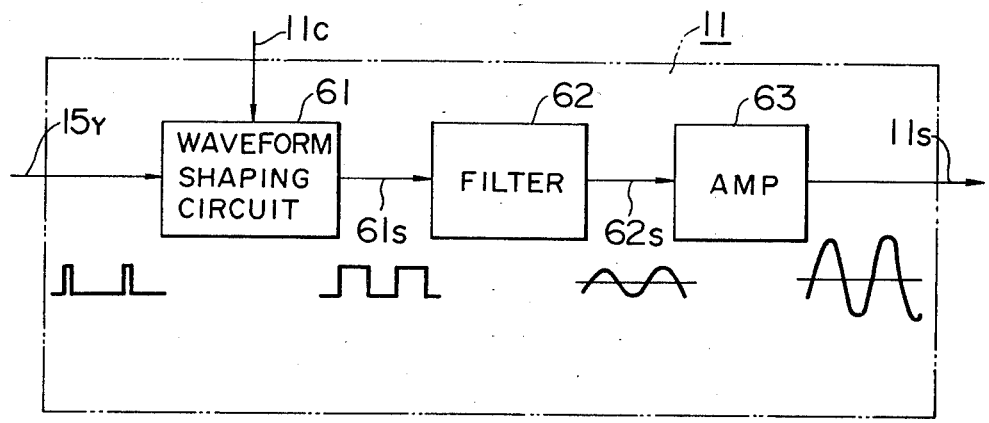
FIG. 8 is a block diagram for showing an example of the power source circuit in FIG. 1.

FIG. 8 shows a circuit arrangement of the power source or on-and-off circuit 11 suitable for use in the case where a metal vapor discharge tube (for example, a sodium vapor lamp) capable of emitting monochromatic light is employed as a light source in the illuminating device 5. As is well known, a discharge tube such as a sodium vapor lamp is energized with an A.C. current to prevent the deterioration of electrodes and hence the quantity of light emitted from the discharge tube pulsates with a frequency twice as high as the power source frequency. Therefore, if the pulsation of the emitted light is not synchronized with the scanning in the TV camera, the brightness of the image is variable at every image field or on various areas in the image and the on-off control timing for the lamp becomes shifted, there arises a problem that the object cannot be stably recognized.

Figure 9:
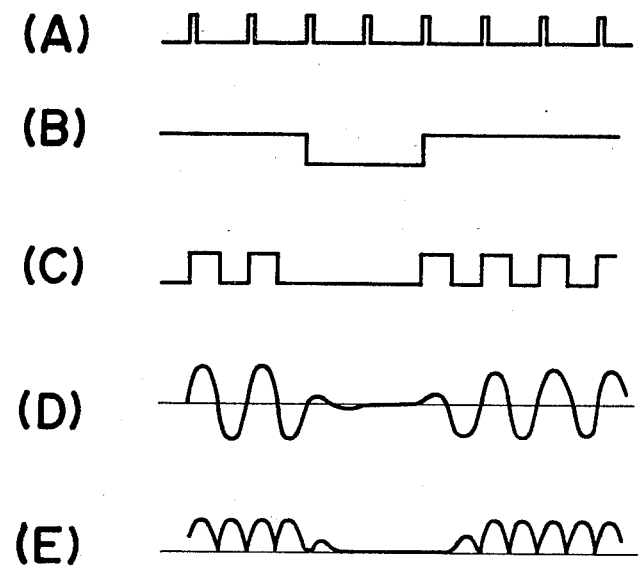
FIG. 9 shows waveforms of signals in the power source circuit shown in FIG. 8.

The on-and-off circuit shown in FIG. 8 receives the vertical synchronizing signal 15Y supplied from the synchronizing signal generator 15. The signal 15Y is pulse-width shaped into a wide pulse width signal with a duty ratio of 50% by a waveform shaping circuit 61. The shaped signal is applied to a filter 62 having a high value of Q, in which it is converted into a sinusoidal wave. The sinusoidal wave signal is passed through an amplifier 63 to obtain a power-amplified signal 11s. Since the wave shaping circuit 61 is also applied with the on-off control signal 11c supplied from the data processor 16 and synchronized with the vertical synchronizing signal 15Y, the circuit 16 delivers its output signal in response to the on-off control signal 11c. Therefore, when the vertical synchronizing signal 15Y and the on-off control signal 11c have waveforms as shown by (A) and (B) in FIG. 9 respectively, the output signal 61s from the wave shaping circuit 61 has a waveform as shown by (C) of FIG. 9. Thus, the output current 11s of the on-and-off circuit 11 has a waveform as shown by (D) of FIG. 9.

With the circuit arrangement shown in FIG. 8, the waveform-shaped signal 61s has the level of "0" during a period when the on-off control signal 11c is kept in the level of "0". As a result, the quantity of light emitted from the discharge tube during such a period can be made nearly equal to zero, as seen from a waveform shown by (E) of FIG. 9.

A metal vapor discharge tube such as a sodium vapor lamp is designed such that the temperature in the tube and hence the vapor pressure of metal when lighted are kept constant in order to maintain the discharge and light emission. It has been found that, when the period of off-state in the aforementioned on-off control is made equal to or less than 0.1 sec., the vapor pressure of metal suffers no change and the discharge equivalent to the discharge at a continuous A.C. running condition providing a stable and constant quantity of emitted light readily recurs at the beginning of the on-state period. If the period of off-state is made longer, a correspondingly long time will be required until the emission reaches the constant light quantity. However, the time lag for an off-state period of 1 sec. is about 0.2 sec. and hence the realization of the present invention is never obstructed by such a time lag. One of advantages obtained by employing such a discharge tube as the illuminating device 5 lies in that light emitted from the discharge tube is monochromatic and any noise pattern originating from the reflection of sunlight or ambient light can be eliminated by selectively introducing the reflected monochromatic light on the TV camera 6 through the filter 9.

In the foregoing, the mark detecting system according to the present invention has been described and shown in conjunction with the case where it is applied to an automatic cargo-handling machine. However, it should be noted that the mark detecting system according to the present invention in which an object provided with a mark is imaged by an image pickup device and in which the position of the mark can be correctly detected even under unstable imaging environments, is not limited to the application in the field of cargo work but is widely applicable to other industrial fields. In the case of the application to the field of cargo work, the provision of two marks on the cargo-handling machine and on the unloading target point as shown in the aforementioned embodiment of the present invention, allows the detection of the swing of cargo by a strong wind as well as the detection of the target position, thereby providing an advantage that the loading to and unloading from the heights can be accurately performed.

Recently, an industrial robot having a flexible arm has been developed for an automatic assembling machine. However, it is very difficult to fabricate a flexible robot arm whose positioning must be made with high accuracy. The present invention is applicable to such an automatic assembling machine. In that case, a mark $M_S$ is provided on a working arm. The positioning of the arm can be performed with high accuracy by checking the position of the mark on an image produced by an image pickup device. Thus, there can be obtained an industrial robot capable of performing the complicated assembling or working which requires high accuracy.

What is claimed is:

1. A mark detecting system for detecting a light reflective mark provided on an object, comprising:
    image pickup means for producing a two-dimensional image of said object on its imaging plane and for scanning said imaging plane to deliver a sequential image signal;
    illuminating means for illuminating the field of view of said image pickup means with light of a specified wavelength, said illuminating means including a metal vapor discharge tube and a driving circuit for causing the discharge of said discharge tube by an alternate current which is in synchronism with the scanning of said imaging plane by said image pickup means;

filter means for preventing light of wavelengths other than said specified wavelength from impinging upon said image pickup means; and a data processing section for processing said image signal to detect a pattern corresponding to said mark.

2. A mark detecting system according to claim 1, wherein said data processing section includes means connected to said driving circuit for controlling the turn-on and turn-off of said illuminating means, and means for comparing the image on said imaging plane at the turn-on state of said illuminating means and the image on said imaging plane at the turn-off state of said illuminating means to extract data of patterns existing on the image only at the turn-on state of said illuminating means, so that said mark is detected on the basis of said extracted data.

3. A mark detecting system according to claim 1, wherein said mark includes a combination of a plurality of characteristic patterns arranged in a predetermined positional relation and having the same characteristic, and said data processing section includes means for delivering position data indicative of positions on the image on said imaging plane in synchronism with the scanning of said imaging plane by said image pickup means, pattern extracting means for processing said image signal from said image pickup means to successively reduce the size of the patterns in said imaging plane and to output a signal indicative of remaining patterns having a predetermined size, means for storing said position data in response to the output signal from said pattern extracting means, and means for selecting from the stored position data a combination of data satisfying said predetermined positional relation, so that the position of said mark is detected.

4. A mark detecting system according to claim 3, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

5. A mark detecting system according to claim 4, wherein said system includes a plurality of stages of said pattern information converting unit whose last stage delivers said binary signal for said picture element representative of said partial area when the third binary signal from said third circuit indicates the presence of said isolated pattern in said partial area and delivers a binary signal indicative of the absence of any pattern when the third binary signal from said third circuit indicates the absence of said isolated pattern in said partial area.

6. A mark detecting system according to claim 1, wherein said mark includes a combination of a plurality of characteristic patterns arranged in a predetermined positional relation and having the same characteristic, and said data processing section includes means for delivering position data indicative of positions on the image on said imaging plane in synchronism with the scanning of said imaging plane by said image pickup means, means for controlling the turn-on and turn-off of said illuminating means, means for processing said image signal from said image pickup means to extract said characteristic patterns, memory means for storing said position data in response to the extraction of said characteristic patterns during a period when said illuminating means is in at least one of the turn-on and turn-off states, and means for comparing the position data stored in said memory means during the period in said at least one state of said illuminating means with the position data obtained in correspondence with the extraction of said characteristic patterns during a period in the other state of said illuminating means to select, from inconsistent data between both the position data, a combination of data satisfying said predetermined positional relation, so that the position of said mark is detected.

7. A mark detecting system according to claim 6, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

8. A mark detecting system according to claim 7, wherein said system includes a plurality of stages of said pattern information converting unit whose last stage delivers said binary signal for said picture element representative of said partial area when the third binary signal from said third circuit indicates the presence of said isolated pattern in said partial area and delivers a binary signal indicative of the absence of any pattern when the third binary signal from said third circuit indicates the absence of said isolated pattern in said partial area.

9. A mark detecting system for detecting a light reflective mark provided on an object, said mark including at least one reflector which regressively reflects light in a direction of incidence thereof, comprising:

image pickup means for producing a two-dimensional image of said object on its imaging plane and for scanning said imaging plane to deliver a sequential image signal;

illuminating means for illuminating the field of view of said image pickup means with light of a specified wavelength, said illuminating means being placed in the vicinity of said image pickup means so that said light of said specified wavelength is reflected from said mark toward said image pickup means;

filter means for preventing light of wavelengths other than said specified wavelength from impinging upon said image pickup means; and a data processing section for processing said image signal to detect a pattern corresponding to said mark.

10. A mark detecting system according to claim 9, wherein said data processing section includes means for controlling the turn-on and turn-off of said illuminating means, and means for comparing the image on said imaging plane at the turn-on state of said illuminating means and the image on said imaging plane at the turn-off state of said illuminating means to extract data of patterns existing on the image only at the turn-on state of said illuminating means, so that said mark is detected on the basis of said extracted data.

11. A mark detecting system according to claim 9, wherein said mark includes a combination of a plurality of characteristic patterns arranged in a predetermined positional relation and having the same characteristic, and said data processing section includes means for delivering position data indicative of positions on the image on said imaging plane in synchronism with the scanning of said imaging plane by said image pickup means, pattern extracting means for processing said image signal from said image pickup means to successively reduce the size of the patterns in said imaging plane and to output a signal indicative of remaining patterns having a predetermined size, means for storing said position data in response to the output signal from said pattern extracting means, and means for selecting from the stored position data a combination of data satisfying said predetermined positional relation, so that the position of said mark is detected.

12. A mark detecting system according to claim 11, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

13. A mark detecting system according to claim 12, wherein said system includes a plurality of stages of said pattern information converting unit whose last stage delivers said binary signal for said picture element representative of said partial area when the third binary signal from said third circuit indicates the presence of said isolated pattern in said partial area and delivers a binary signal indicative of the absence of any pattern when the third binary signal from said third circuit indicates the absence of said isolated pattern in said partial area.

14. A mark detecting system according to claim 9, 10, 11, 12 or 13, wherein said illuminating means includes a metal vapor discharge tube and a driving circuit for causing the discharge of said discharge tube by an alternating current which is in synchronism with the scanning of said imaging plane by said image pickup means.

15. A mark detecting system according to claim 9, wherein said mark includes a combination of a plurality of characteristic patterns arranged in a predetermined positional relation and having the same characteristic, and said data processing section includes means for delivering position data indicative of positions on the image on said imaging plane in synchronism with the scanning of said imaging plane by said image pickup means, means for controlling the turn-on and turn-off of said illuminating means, means for processing said image signal from said image pickup means to extract said characteristic patterns, memory means for storing said position data in response to the extraction of said characteristic patterns during a period when said illuminating means is in at least one of the turn-on and turn-off states, and means for comparing the position data stored in said memory means during the period in said at least one state of said illuminating means with the position data obtained in correspondence with the extraction of said characteristic patterns during a period in the other state of said illuminating means to select, from inconsistent data between both the position data, a combination of data satisfying said predetermined positional relation, so that the position of said mark is detected.

16. A mark detecting system according to claim 15, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said parallel area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

17. A mark detecting system according to claim 16, wherein said system includes a plurality of stages of said pattern information converting unit whose last stage delivers said binary signal for said picture element representative of said partial area when the third binary signal from said third circuit indicates the presence of said isolated pattern in said partial area and delivers a binary signal indicative of the absence of any pattern when the third binary signal from said third circuit indicates the absence of said isolated pattern in said partial area.

18. An automatic position control system for locating a movable body provided with a first light reflective mark, at a target position provided with a second light reflective mark, comprising:

image pickup means for producing on its imaging plane a two-dimensional image of its field of view containing therein said marks and for scanning said imaging plane to deliver an image signal;

illuminating means for illuminating said field of view of said image pickup means with light of a specified wavelength, said illuminating means including a metal vapor discharge tube and a driving circuit for causing the discharge of said discharge tube by an alternate current which is in synchronism with the scanning of said imaging plane by said image pickup means;

filter means for preventing light of wavelengths other than said specified wavelength from impinging upon said image pickup means; and a data processing section for processing said image signal to detect patterns corresponding to said first and second marks and to deliver a movable body control signal in accordance with a positional relation between said patterns.

19. A mark detecting system according to claim 18, wherein said data processing section includes means connected to said driving circuit for controlling the turn-on and turn-off of said illuminating means, and means for comparing the image on said imaging plane at the turn-on state of said illuminating means and the image on said imaging plane at the turn-off state of said illuminating means to extract data of patterns existing on the image only at the turn-on state of said illuminating means, so that the pattern corresponding to each of said first and second marks is detected on the basis of said extracted data.

20. An automatic position control system according to claim 18, wherein said first mark includes a combination of a plurality of characteristic patterns arranged in a first predetermined positional relation and having the same characteristic, said second mark includes a combination of a plurality of characteristic patterns arranged in a second predetermined positional relation different from said first predetermined positional relation and having said same characteristic, and said data processing section includes means for delivering position data indicative of positions on the image on said imaging plane in synchronism with the scanning of said imaging plane by said image pickup means, pattern extracting means for processing said image signal from said image pickup means to successively reduce the size of the patterns in said imaging plane and to output a signal indicative of remaining patterns having a predetermined size, means for storing said position data in response to the output signal from said pattern extracting means, and means for selecting, from the stored position data, respective combinations of data satisfying said first and second predetermined positional relations, so that the positions of said first and second marks are detected.

21. An automatic position control system according to claim 20, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

22. An automatic position control system according to claim 18, wherein said first mark includes a combination of a plurality of characteristic patterns arranged in a first predetermined positional relation and having the same characteristic, said second mark includes a combination of a plurality of characteristic patterns arranged in a second predetermined positional relation different from said first predetermined positional relation and having said same characteristic, and said data processing section includes means for delivering position data indicative of positions on the image on said imaging planes in synchronism with the scanning of said imaging plane by said image pickup means, means for controlling the turn-on and turn-off of said illuminating means, means for processing said image signal from said image pickup means to extract said characteristic patterns, memory means for storing said position data in response to the extraction of said characteristic patterns during a period when said illuminating means is in at least one of the turn-on and turn-off states, and means for comparing the position data stored in said memory means during the period in said at least one state of said illuminating means with the position data obtained in correspondence with the extraction of said characteristic patterns during a period in the other state of said illuminating means to select, from inconsistent data between both the position data, respective combinations of data satisfying said first and second predetermined positional relations, so that the positions of said first and second marks are detected.

23. An automatic position control system according to claim 22, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

24. An automatic position control system for locating a movable body provided with a first light reflective mark, at a target position provided with a second light reflective mark, each of said first and second marks including at least one reflector which regressively reflects light in a direction of incidence thereof, comprising:
image pickup means for producing on its imaging plane a two-dimensional image of its field of view containing therein said marks and for scanning said imaging plane to deliver an image signal;
illuminating means for illuminating said field of view of said image pickup means with light of a specified wavelength, said illuminating means being placed in the vicinity of said image pickup means so that said light of said specified wavelength is reflected from said each of said first and second marks toward said image pickup means;
filter means for preventing light of wavelengths other than said specified wavelength from impinging upon said image pickup means; and
a data processing section for processing said image signal to detect patterns corresponding to said first and second marks and to deliver a movable body control signal in accordance with a positional relation between said patterns.

25. An automatic position control system according to claim 24, wherein said data processing section includes means for controlling the turn-on and turn-off of said illuminating means, and means for comparing the image on said imaging plane at the turn-on state of said illuminating means and the image on said imaging plane at the turn-off state of said illuminating means to extract data of patterns existing on the image only at the turn-on state of said illuminating means, so that the pattern corresponding to each of said first and second marks is detected on the basis of said extracted data.

26. An automatic position control system according to claim 24, wherein said first mark includes a combination of a plurality of characteristic patterns arranged in a first predetermined positioned relation and having the same characteristic, said second mark includes a combination of a plurality of characteristic patterns arranged in a second predetermined positional relation different from said first predetermined positional relation and having said same characteristic, and said data processing section includes means for delivering position data indicative of positions on the image on said imaging plane in sychronism with the scanning of said imaging plane by said image pickup means, pattern extracting means for processing said image signal from said image pickup means to successively reduce the size of the patterns in said imaging plane and to output a signal indicative of remaining patterns having a predetermined size, means for storing said position data in response to the output signal from said pattern extracting means, and means for selecting, from the stored position data, respective combinations of data satisfying said first and second predetermined positional relations, so that the positions of said first and second marks are detected.

27. An automatic position control system according to claim 26, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

28. An automatic position control system according to claim 24, wherein said first mark includes a combination of a plurality of characteristic patterns arranged in a first predetermined positional relation and having the same characteristic, said second mark includes a combination of a plurality of characteristic patterns arranged in a second predetermined positional relation different from said first predetermined positional relation and having said same characteristic, and said data processing section includes means for delivering position data indicative of positions on the image on said imaging planes in synchronism with the scanning of said imaging plane by said image pickup means, means for controlling the turn-on and turn-off of said illuminating means, means for processing said image signal from said image pickup means to extract said characteristic patterns, memory means for storing said position data in response to the extraction of said characteristic patterns during a period when said illuminating means is in at least one of the turn-on and turn-off states, and means for comparing the position data stored in said memory means during the period in said at least one state of said illuminating means with the position data obtained in correspondence with the extraction of said characteristic patterns during a period in the other state of said illuminating means to select, from inconsistent data between both the position data, respective combination of data satisfying said first and second predetermined positional relations, so that the positions of said first and second marks are detected.

29. An automatic position control system according to claim 28, wherein said pattern extracting means includes a thresholding unit for converting said image signal from said image pickup means into a binary signal for every picture element making up said image, and at least one stage of a pattern information converting unit including a first circuit for temporarily storing said binary signal indicating the picture element information to parallely deliver respective binary signals for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

30. An automatic position control system according to claims 24, 25, 26, 28, 27 or 29, wherein said illuminating means includes a metal vapor discharge tube and a driving circuit for causing the discharge of said discharge tube by an alternating current which is in synchronism with the scanning of said imaging plane by said image pickup means.

31. A mark detecting system for detecting a light reflective mark provided on an object, said mark including a combination of a plurality of characteristic patterns arranged in a predetermined positional relation and having the same characteristic, comprising:
  image pickup means for producing a two-dimensional image of said object on its imaging plane and for scanning said imaging plane to deliver an image signal;
  illuminating means for illuminating the field of view of said image pickup means with light of a specified wavelength;
  filter means for preventing light of wavelengths other than said specified wavelength from impinging upon said image pickup means; and
  a data processing section for processing said image signal to detect a pattern corresponding to said mark, said data processing section including means for delivering position data indicative of positions on the image on said imaging plane in synchronism with the scanning of said imaging plane by said image pickup means, means for controlling the turn-on and turn-off of said illuminating means, means for processing said image signal from said image pickup means to extract said characteristic patterns, memory means for storing said position data in response to the extraction of said characteristic patterns during a period when said illuminating means is in at least one of the turn-on and turn-off states, and means for comparing the position data stored in said memory means during the period in said at least one state of said illuminating means with the position data obtained in correspondence with the extraction of said characteristic patterns during a period in the other state of said illuminating means to select, from inconsistent data between both the position data, a combination of data satisfying said predetermined positional relation, so that the position of said mark is detected.

32. A mark detecting system according to claim 31, wherein said characteristic pattern extracting means includes a thresholding unit for converting said image signal from said image pickup means into a binary signal for every picture element making up said image, and at least one stage of a pattern information converting unit including a first circuit for temporarily storing said binary signal indicating the picture element information to deliver respective binary signals in parallel for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

33. A mark detecting system according to claim 32, wherein said system includes a plurality of stages of said pattern information converting unit whose last stage delivers said binary signal for said picture element representative of said partial area when the third binary signal from said third circuit indicates the presence of said isolated pattern in said partial area and delivers a binary signal indicative of the absence of any pattern when the third binary signal from said third circuit indicates the absence of said isolated pattern in said partial area.

34. An automatic position control system for locating a movable body provided with a first light reflective mark, at a target position provided with a second light reflective mark, said first mark including a combination of a plurality of characteristic patterns arranged in a first predetermined positional relation and having the same characteristic, said second mark includes a combination of a plurality of characteristic patterns arranged in a second predetermined positional relation different from said first predetermined positional relation and having said same characteristic, comprising:
  image pickup means for producing on its imaging plane a two-dimensional image of its field of view containing therein said marks and for scanning said imaging plane to deliver an image signal;
  illuminating means for illuminating said field of view of said image pickup means with light of a specified wavelength;
  filter means for preventing light of wavelengths other than said specified wavelength from impinging upon said image pickup means; and
  a data processing section for processing said image signal to detect patterns corresponding to said first and second marks and to deliver a movable body control signal in accordance with a positional relation between said patterns, said data processing section including means for delivering position data indicative of positions on the image on said imaging planes in synchronism with the scanning of said imaging plane by said image pickup means, means for controlling the turn-on and turn-off of said illuminating means, means for processing said image signal from said image pickup means to extract said characteristic patterns, memory means for storing said position data in response to the extraction of said characteristic patterns during a period when said illuminating means is in at least one of the turn-on and turn-off states, and means for comparing the position data stored in said memory means during the period in said at least one state of said illuminating means with the position data obtained in correspondence with the extraction of said characteristic patterns during a period in the other state of said illuminating means to select, from inconsistent data between both the position data, respective combinations of data satisfying said first and second predetermined positional relations, so that the positions of said first and second marks are detected.

35. An automatic position control system according to claim 34, wherein said characteristic pattern extracting means includes a thresholding unit for converting said image signal from said image pickup means into a binary signal for every picture element making up said image, and at least one stage of a pattern information converting unit including a first circuit for temporarily storing said binary signal indicating the picture element information to deliver respective binary signals in parallel for picture elements making up a partial area of said image, a second circuit for judging the size of a pattern contained in said partial area on the basis of an output from said first circuit to deliver a second binary signal, a third circuit for judging the presence or absence of an isolated pattern in said partial area on the basis of the output from said first circuit to deliver a third binary signal, and a fourth circuit for selecting in accordance with an output from said third circuit either one of said second binary signal and the binary signal from said first circuit for a picture element representative of said partial area to deliver the selected signal to a succeeding circuit, so that the information of the picture elements is successively converted to reduce the size of the pattern contained in said image.

* * * * *